Patented Oct. 13, 1942

2,299,048

UNITED STATES PATENT OFFICE 2,299,048

PURIFICATION OF PENTAERYTHRITOL

Joseph A. Wyler and Edwin A. Wernett, Allentown, Pa., assignors to Trojan Powder Company, Allentown, Pa.

No Drawing. Application December 15, 1939, Serial No. 309,352

3 Claims. (Cl. 260—637)

Our invention relates in general to the purification of pentaerythritol and more particularly to the crystallization of pentaerythritol from mixtures of pentaerythritol and dipentaerythritol containing more than approximately 70% of pentaerythritol.

Present commercial processes for the preparation of pentaerythritol are based upon the condensation of one molecule of acetaldehyde with four molecules of formaldehyde, in alkaline media, at temperatures not exceeding 50° C., and in such a volume of water as to provide a solution to contain less than 20% of aldehydes at the beginning of the condensation. The following equation is representative of the main reaction:

$$8CH_2O + 2CH_3CHO + Ca(OH)_2 = 2C(CH_2OH)_4 + Ca(HCOO)_2$$
Pentaerythritol

In addition to this reaction, others producing dipentaerythritol and syrupy products take place.

The pentaerythritol formed, as described above, is first separated from its solution as an impure product by precipitating the lime as sulfate or oxalate, filtering, evaporating the filtrate to small volume and cooling. This product will usually contain about 10–15% of dipentaerythritol and have a melting point of about 230–244° C. It is often too impure for many commercial purposes and possesses more or less of a brownish colored impurity which may be removed by water washing or by dissolving the crude pentaerythritol in hot water, stirring with charcoal, filtering while still hot and cooling to room temperature to effect the crystallization of a purified product which is still of a relatively low melting point. Our invention is particularly well adapted to the separation of high purity pentaerythritol out of a solution made from this pentaerythritol.

It is well known that commercial pentaerythritol is essentially a mixture of pentaerythritol and dipentaerythritol

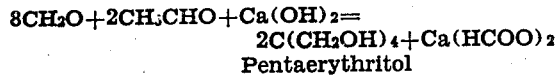

in varying proportions. The melting point of pure pentaerythritol is 260.5° C. and of pure dipentaerythritol, 221° C. These, in dry condition, form a eutectic mixture which contains about 35% dipentaerythritol and 65% pentaerythritol and melts at about 190° C. Also, it is generally recognized in this art, that it is difficult and laborious to separate a pentaerythritol of melting point greater than 250° C. from ordinary crude pentaerythritol. Several recrystallizations have usually been found necessary and even then the results were not consistent.

In this connection we are presenting our method for the determination of the melting point of pentaerythritol, as this has an important bearing upon the result which is considered to be the true melting point.

The sample of pentaerythritol to be tested is finely ground (thru 100 mesh) in an agate mortar, placed on a watch glass and dried at 100–110° C. for two hours. Portions of this dried material are charged into dry, hot, melting-point tubes (16 cm. long, thin walled, lower end 1–1.5 mm. outside diameter) by gently tapping the tubes upon a glass plate, charging each tube in three portions to a height of 7–8 mm. and tapping each tube ten times from a height of about 2″ for each of the three portions.

These charged tubes attached to a standardized thermometer are then placed in a suitable, stirred, molten bath at 200° C. and the bath temperature raised at the rate of 1° per minute until a temperature of about 245° C. is reached when the rate is slowed down to 1° C. per three minutes.

The beginning of melting is taken as the point at which the first meniscus forms, and the completion of melting is that point at which the complete charge is just melted, but still contains air bubbles.

All thermometer corrections must be made.

We have discovered that pentaerythritol and dipentaerythritol form at least two double compounds with one another in water solutions. One of these has a melting range of about 185–190° C. and consists of approximately 30% dipentaerythritol and 70% pentaerythritol. This double compound is very stable and does not decompose in hot water solution, as is shown by the fact that it may be repeatedly crystallized out of hot water solutions without undergoing any decomposition. This double compound is the subject of a copending application Serial No. 326,380 (now Patent No. 2,251,236). The other double compound is unstable in hot (above 65–70° C.) water solutions. We have found that if a water solution of pentaerythritol and dipentaerythritol containing more than about 70 parts of pentaerythritol for 30 parts of dipentaerythritol is evaporated at temperatures above 65–70° C. and the crystals allowed to separate above this point, the crystals will have a melting point of greater than 250° C. provided the concentration of the solution is not allowed to exceed the solubility at 65–70° C. of the low-melting-point double compound.

In order more clearly to point out our invention we give the following example (in which all parts are by weight):

*Example 1*

About 100 parts of crude pentaerythritol (melting point 235–244° C.) are dissolved in 200 parts of hot water contained in a steam jacketed kettle. The solution is treated with a small amount of decolorizing charcoal, stirred in the kettle and filtered. The clear, colorless filtrate is run into another steam jacketed kettle in which the solution is boiled down until a relatively thick mush of pentaerythritol crystals has separated. The latter are then discharged into a hot (above 70° C.) centrifugal and whizzed to a low moisture content. The contents of the centrifugal may then be given a rapid warm water or propyl alcohol wash. The centrifuged product is then removed and dried at about 100° C. This product will be snow white and have a melting point higher than 250° C. The mother liquor, upon cooling, will deposit a small proportion of pentaerythritol of low melting point (about 231–241° C.) and the mother liquor from these latter crystals will contain largely, material melting at 190–200° C. The 231–241° C. fraction may be used over in the next batch and further quantities of the high melting point pentaerythritol separated in the manner just described. The yield of 250°+ C. melting point pentaerythritol usually received is about 70–80 parts.

The point beyond which the evaporation should not be carried is readily determinable by the experienced operator and, of course, varies with the nature of the crude pentaerythritol used. By observing the boiling point of the mixture at atmospheric pressure or examining a small test sample, the operator soon knows when to stop the boiling. Thus, if the boiling point commences to rise above 108° C., or, if a test sample, upon cooling, begins to show a peculiar milkiness in its mother liquor, the evaporation should be discontinued and the crystals separated. This milkiness is due to the separation of crystals of the 185–190° C. melting point double compound.

In carrying out the above operations it is essential to prevent the evaporated liquor from cooling to below 70° C. before the crystals are separated from the solution, as this causes the separation of low-melting-point double compound. Also, the best results are obtained when the drying of the pentaerythritol crystals upon the upper portion of the evaporator is prevented. This may be accomplished by boiling at constant volume (allowing the colorless pentaerythritol solution to run into the evaporator as fast as the water is boiled off) or by having a small amount of refluxing taking place on the inside of the evaporator, thus washing the newly formed pentaerythritol crystals back into the main portion of the liquor being boiled and preventing caking.

The example just given represents the preferred manner of carrying out our process, but we do not confine ourselves to these exact details. We may, for instance, discharge the contents of the evaporator, which is at, say, 106° C., into a hot tank provided with a stirrer, cool the mixture to 70–75° C. with constant stirring, and then separate the crystals by suction filtration or centrifuging, or we may separate the crystals at any intermediate temperature. We may also evaporate the solutions at superatmospheric pressure, but in all cases it is necessary to exercise customary skill in handling, centrifuging, washing and drying the crystals so as to avoid local cooling to below 70° C. and unnecessary contamination of the crystals by impurities in the mother liquid. Similarly, we may use subatmospheric pressure provided the temperature in the liquor is above 70° C. at the time of crystallization.

Using our process we have obtained pentaerythritol of a melting point as high as 257° C. and our average product will have a melting point of about 251–253° C. We have found that, all other conditions being constant, the separation of pentaerythritol crystals above 100° C. yields a product of higher melting point and better physical appearance than when the separation is carried out at, say, between 90° and 70° C. It appears that the separation of crystals during the boiling is more perfect and the crystals occlude less mother liquor, the net result being an improved product.

We claim:

1. The process of preparing pentaerythritol with a melting point greater than 250° C. from a mixture consisting essentially of pentaerythritol and dipentaerythritol and having a melting point substantially below 250° C., the pentaerythritol being present in the mixture in an amount in excess of 70% by weight of the total amount of pentaerythritol and dipentaerythritol, which comprises dissolving said mixture in water, effecting crystallization of the pentaerythritol from the resulting solution by cooling said solution to a temperature from not above about 108° C. to a temperature not below about 70° C., and separating said crystals from the mother liquid at a temperature between about 70° C. and 108° C.

2. The process of preparing pentaerythritol with a melting point greater than 250° C. from a mixture consisting essentially of pentraerythritol and dipentaerythritol and having a melting point substantially below 250° C., the pentaerythritol being present in the mixture in an amount in excess of 70% by weight of the total amount of pentaerythritol and dipentaerythritol, which comprises dissolving said mixture in water, boiling the resulting solution to concentrate it, discontinuing said boiling before the boiling point of the solution reaches about 108° C., crystallizing the pentaerythritol from said solution at a temperature between about 70° C. and 108° C., and separating said crystals from the mother liquor at a temperature between about 70° C. and 108° C.

3. The process of preparing pentaerythritol with a melting point greater than 250° C. from a mixture consisting essentially of pentaerythritol and dipentaerythritol and having a melting point substantially below 250° C., the pentaerythritol being present in the mixture in an amount in excess of 70% by weight of the total amount of pentaerythritol and dipentaerythritol, which comprises dissolving said mixture in water, boiling the resulting solution to concentrate it, discontinuing said boiling before the boiling point of the solution reaches about 108° C., crystallizing the pentaerythritol from said solution at a temperature between about 100° C. and 108° C., separating said crystals from the mother liquor at a temperature between about 100° C. and 108° C., and washing and drying the crystals.

JOSEPH A. WYLER.
EDWIN A. WERNETT.